US012308880B2

(12) United States Patent
Ponzini et al.

(10) Patent No.: US 12,308,880 B2
(45) Date of Patent: May 20, 2025

(54) ACCESS NETWORK AND WIRELESS DEVICE

(71) Applicant: Telefonaktiebolaget LM Ericsson (publ), Stockholm (SE)

(72) Inventors: Filippo Ponzini, Pisa (IT); Giulio Bottari, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 61 days.

(21) Appl. No.: 17/784,831

(22) PCT Filed: Dec. 13, 2019

(86) PCT No.: PCT/EP2019/084999
§ 371 (c)(1),
(2) Date: Jun. 13, 2022

(87) PCT Pub. No.: WO2021/115611
PCT Pub. Date: Jun. 17, 2021

(65) Prior Publication Data
US 2023/0007844 A1    Jan. 12, 2023

(51) Int. Cl.
*H04B 10/114*    (2013.01)
*H04B 10/116*    (2013.01)
(Continued)

(52) U.S. Cl.
CPC ....... *H04B 10/1149* (2013.01); *H04B 10/116* (2013.01); *H04W 36/0022* (2013.01); *H04W 76/10* (2018.02)

(58) Field of Classification Search
CPC ........ H04B 10/11–118; H04B 10/1149; H04B 10/116; H04W 36/0022; H04W 76/10
(Continued)

(56) References Cited

U.S. PATENT DOCUMENTS 10,686,523 B1 *  6/2020  Gleason ............... H01Q 21/065
10,693,557 B1 *  6/2020  Ayotte ................. H04B 10/116
(Continued)

FOREIGN PATENT DOCUMENTS

EP    3416305 A1    12/2018
EP    3416305 B1 *  2/2020    ......... H04B 10/1129
(Continued)

OTHER PUBLICATIONS

*SuperGuide Corp. v. DirecTV Enters (SuperGuide Corp. v. DirecTV Enters., Inc.*, 358 F.3d 870, 69 U.S.P.Q.2d 1865 (Fed. Cir. 2004), Court Opinion, WCHIN44 on Thu, Feb. 15, 2024 11:21:14-0500 (Year: 2024).*

(Continued)

*Primary Examiner* — Li Liu
(74) *Attorney, Agent, or Firm* — Weisberg I.P. Law, P.A.

(57) ABSTRACT

An access network for communication with a wireless device (100), the access network comprising a plurality of antennas each configured to provide a cell for radio frequency communication with the wireless device, and a plurality of sets of optical elements (40) configured for optical communication with the wireless device (100). The access network comprises a processor and a memory, said memory containing instructions executable by said processor whereby said apparatus is operative to connect to the wireless device with both the radio frequency communication and optical communication, and connect to the wireless device with the radio frequency communication at least in a downlink direction, and connect to the wireless device with the optical communication at least in an uplink direction.

15 Claims, 13 Drawing Sheets

(51) Int. Cl.
*H04W 36/00* (2009.01)
*H04W 76/10* (2018.01)

(58) Field of Classification Search
USPC .................................................. 398/115–131
See application file for complete search history.

(56) References Cited

U.S. PATENT DOCUMENTS

| | | | |
|---|---|---|---|
| 2017/0047998 A1 | 2/2017 | Palanisamy et al. | |
| 2017/0208489 A1* | 7/2017 | Djordjevic | H04W 84/005 |
| 2017/0223810 A1* | 8/2017 | Bernsen | F21V 33/00 |
| 2017/0230859 A1* | 8/2017 | Nadji | H04W 76/14 |
| 2021/0321347 A1* | 10/2021 | Ghoraishi | H04W 56/0025 |
| 2022/0077927 A1* | 3/2022 | Choi | H04B 10/556 |
| 2022/0182154 A1* | 6/2022 | Wendt | H04B 10/807 |
| 2022/0303004 A1* | 9/2022 | Taniguchi | H04B 10/11 |
| 2023/0025646 A1* | 1/2023 | Shiina | H04B 10/116 |

FOREIGN PATENT DOCUMENTS

| | | | |
|---|---|---|---|
| WO | 2014199323 A2 | 12/2014 | |
| WO | 2018108294 A1 | 6/2018 | |
| WO | WO-2019100789 A1 * | 5/2019 | H04B 1/00 |

OTHER PUBLICATIONS

Sabella, Roberto, et al., "Industrial automation enabled by Robotics, Machine Intelligence and 5G", Ericsson Technology Review, 5G and Industrial Automation, Feb. 15, 2018, 1-13.
Von Butovitsch, Peter, et al., "Advanced antenna systems for 5G networks", Ericsson white paper, GFMC-18:000530, Nov. 2018, 1-15.

* cited by examiner

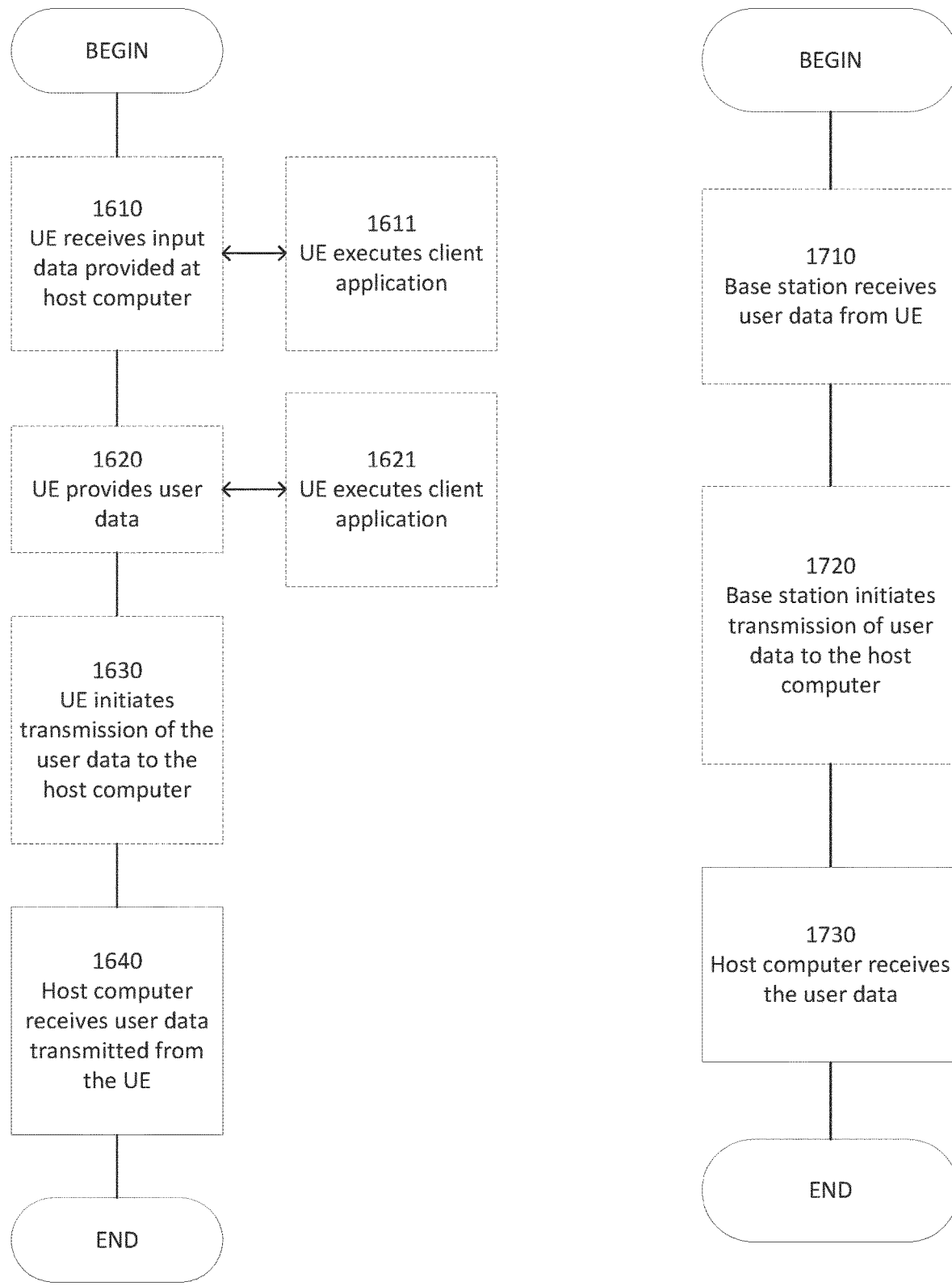

ACCESS NETWORK AND WIRELESS DEVICE

TECHNICAL FIELD

Examples of the present disclosure relate to an access network, a network node of an access network and a wireless device. Examples relate to an access network, a network node and wireless device using both a radio link and an optical link.

BACKGROUND

Industry 4.0 describes a trend towards automatic in manufacturing technology. This is occurring at the same time as the introduction of 5G radio technology. In the context of smart manufacturing, 5G allows a reduced infrastructure cost by enabling replacement of cables with industry-grade cellular connectivity. Less cabling in the factory also implies increased floorplan layout flexibility and easier deployment of new factory equipment like robots and sensors.

Elements of the future of factories may include Automated Guided Vehicles (AGV), for example, moving vehicles which enable a "multidirectional layout" of a production line instead of the current "linear layout" provided by conventional conveyors. AGVs provide for shuttling of the various materials inside and among the work cells and between the production line and the warehouses/loading bays.

Example AGV may have a connectivity to a network via Wi-Fi or Bluetooth to receive high level instructions (e.g. a path sequence) and communicate acknowledgments, sensors data, alarms etc. All the navigation, safety, and control software are processed on-board of the AGV. This requires powerful processors on board, a high battery consumption, and limited upgradability in the AGV lifetime.

By connecting an AGVs with 5G to a network, most of the internal computation can me moved to a central data processing center, e.g. in a cloud, where the computation can benefit from an enormous amount of computing power. 5G facilitates moving large data amounts between the machine and the cloud and, in addition, ensures the low latency needed to send instruction to the AGV without delays.

Examples of functionalities which can be moved to cloud are visual navigation, collision avoidance (both machine-machine and machine-human collisions), remote control and supervision. Coordination among AGVs, to accomplish a shared task, is also facilitated by having a central control point, for example, in the cloud. Coordination between the AGVs enables platooning or swarming of AGVs.

Cellular technologies, such as 4G or 5G, ensure better coverage over an area than Wi-Fi by providing a smooth handover between cells. For example, for indoor small cells, radio control ensures smooth handover. This is particular important for AGVs which move around the factory, which is significantly larger than an area which could be provided by a single Wi-Fi access point. On the contrary, Wi-Fi solutions present "dead spots" because AGVs must reconnect with each individual access point. This situation is not suited to deploy AGVs or "cloud robotics".

A possible implementation of "cloud-driven" AGVs requires data rates of tens or even hundreds of Mbps for each vehicle. It is useful to efficiently provide connectivity for these high data rates.

SUMMARY

One aspect of the present disclosure provides an access network for communication with a wireless device. The access network comprising a plurality of antennas each configured to provide a cell for radio frequency communication with the wireless device, and a plurality of sets of optical elements configured for optical communication with the wireless device. The access network comprises a processor and a memory, said memory containing instructions executable by said processor whereby said apparatus is operative to connect to the wireless device with both the radio frequency communication and optical communication, and connect to the wireless device with the radio frequency communication at least in a downlink direction, and connect to the wireless device with the optical communication at least in an uplink direction.

Another aspect of the present disclosure provides a method in an access network for communication with a wireless device. The method comprises establishing cells for radio frequency communication with the wireless device, and establishing optical links using a plurality of sets of optical elements configured for optical communication with the wireless device. The method further comprises connecting the access network to the wireless device with both the radio frequency communication and optical communication, and wherein the access network connects to the wireless device with the radio frequency communication at least in a downlink direction, and connects to the wireless device with the optical communication at least in an uplink direction.

Another aspect of the present disclosure provides a wireless device for communication with an access network. The wireless device comprises an antenna configured to provide radio frequency communication with a cell of the access network; and one or more optical elements configured for optical communication with the access network. The wireless device comprises a processor and a memory, said memory containing instructions executable by said processor whereby said apparatus is operative to connect to the access network with both the radio frequency communication and optical communication by connecting to the access network with the radio frequency communication at least in a downlink direction, and to the access network with the optical communication at least in an uplink direction.

Another aspect of the present disclosure provides a method in a wireless device for communication with an access network. The method comprises establishing radio frequency communication with the access network, and establishing optical communication with the access network. The method further comprises connecting the wireless device to the access network with both the radio frequency communication and optical communication by connecting to the access network with the radio frequency communication at least in a downlink direction, and to the access network with the optical communication at least in an uplink direction.

Another aspect of the present disclosure provides a network node of an access network for communication with a wireless device. The network node comprises an antenna configured to provide a cell for radio frequency communication with the wireless device, and a set of one or more optical elements configured for optical communication with the wireless device. The network node comprises a processor and a memory, said memory containing instructions executable by said processor whereby said apparatus is operative to connect to the wireless device with both the radio frequency communication and optical communication, and connect to the wireless device with the radio frequency communication at least in a downlink direction, and connect to the wireless device with the optical communication at least in an uplink direction.

Another aspect of the present disclosure provides a method in a network node of an access network for communication with a wireless device. The method comprises establishing a cell for radio frequency communication with the wireless device, and establishing an optical link using a set of optical elements configured for optical communication with the wireless device. The method further comprises connecting the network node to the wireless device with both the radio frequency communication and optical communication, and wherein the access network connects to the wireless device with the radio frequency communication at least in a downlink direction, and connects to the wireless device with the optical communication at least in an uplink direction.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 15 is a flowchart illustrating another method implemented in a communication system, in accordance with one embodiment; and FIG. 16 is a flowchart illustrating another method implemented in a communication system, in accordance with one embodiment.

DETAILED DESCRIPTION

Examples of the present disclosure provide an optical offload of radio resources. In some aspects, a radio antenna is complemented with optical elements providing an optical link. In one example, RF radio beams are used at least in downlink (from the antenna to a wireless device) while optical based communication is used at least in uplink (from the wireless device to the antenna).

The present disclosure provides an access network and a wireless device which can communicate with a high data rate over a relatively large area. This is particularly applicable to indoor applications in a factory plant or in an indoor warehouse. Examples use an Advanced Antenna System (AAS) for a radio network.

Figure 1:
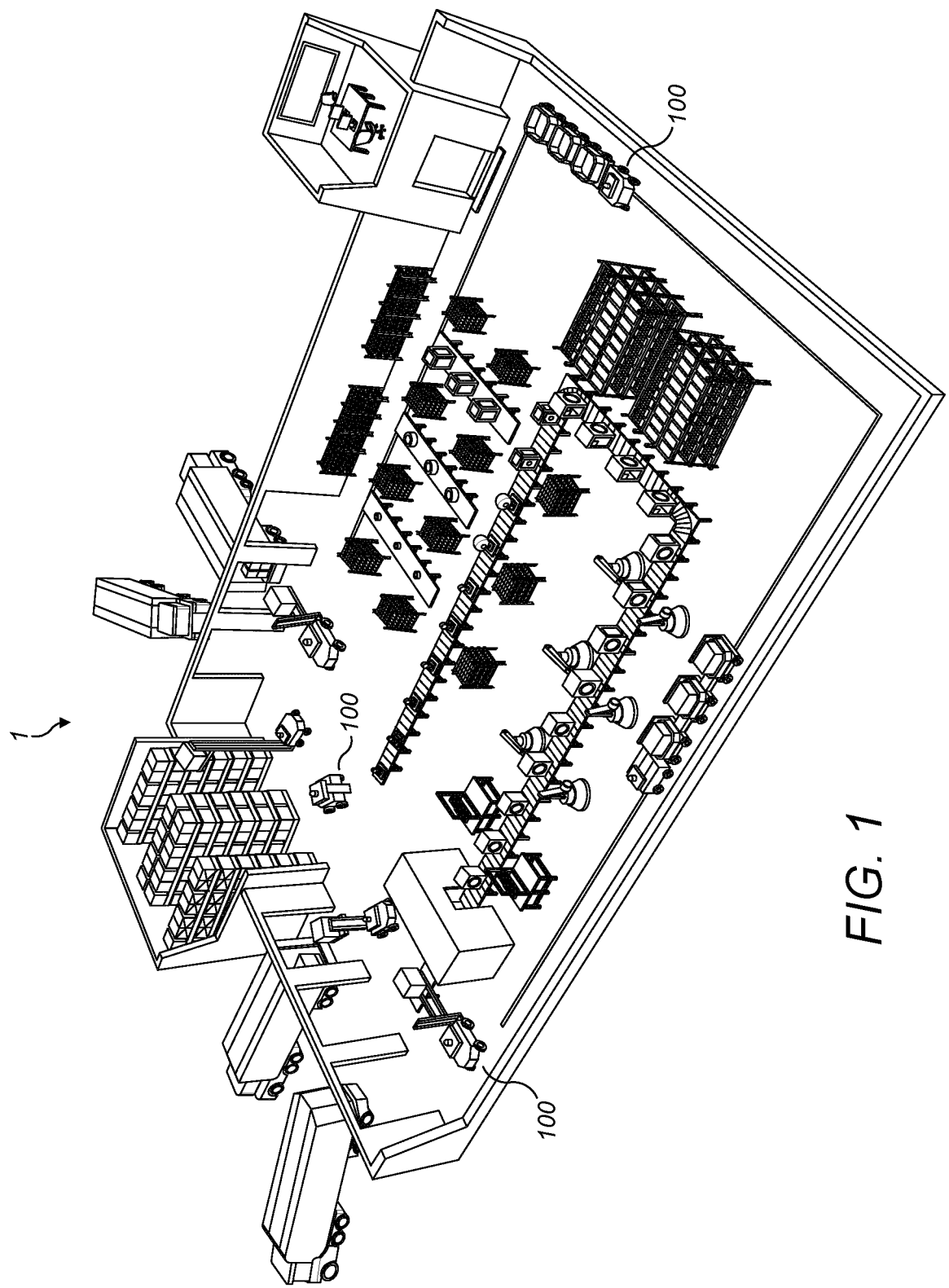
FIG. 1 illustrates an example of an industry setting for embodiments of the disclosure.

FIG. 1 illustrates an exemplary industry setting of a factory or plant layout. The plant provides a large indoor area over which multiple wireless devices 100 which can move. The wireless device 100 may, for example, be (or included within) a AGV, robot, industrial device, a vehicle, and may also referred to as a User Equipment (UE) or wireless terminal. These are examples of a type of device which might benefit from the connectivity provided by the present disclosure. The term wireless device will be used for the mobile device which is connected to the access network.

Aspects of the disclosure provide an access network, which may also be referred to as a network or a radio-optical access network. The access network comprises a plurality of network nodes comprising or connected to radio antennas, also referred to as antennas. The antennas may be located in different locations around the plant, to provide radio coverage throughout the required area. The antennas transmit (and in some examples also receive) radio signals to provide a cell for communication with one or more wireless device. The antennas may be considered as providing a small radio cell (i.e. small cell). The access network provides a plurality of radio cells which cover the area over which the wireless devices are intended to move. The access network may further comprise radio frequency circuitry and/or baseband circuitry, connected by wired or wireless connections. The access network may comprise one or more base stations. The access network may comprise a connection or interface to a processing node, configured to perform computation on data received from and/or transmitted to the wireless devices. References to antennas, antenna units and network nodes may be used interchangeably.

Figure 2B:
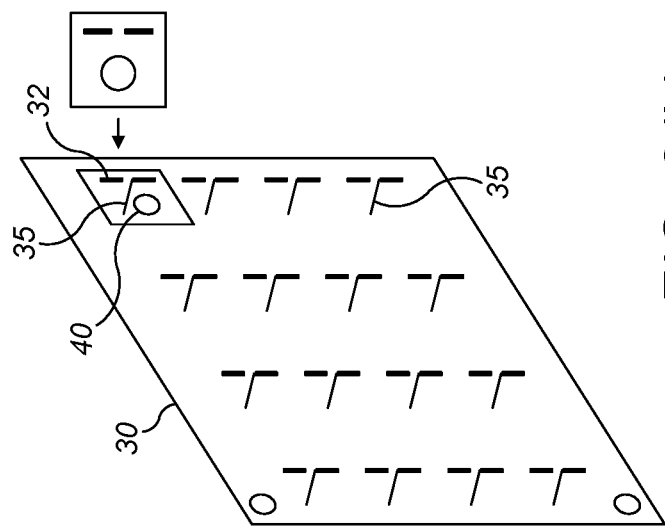
FIGS. 2a and 2b are examples of part of the access network.
Figure 2A:
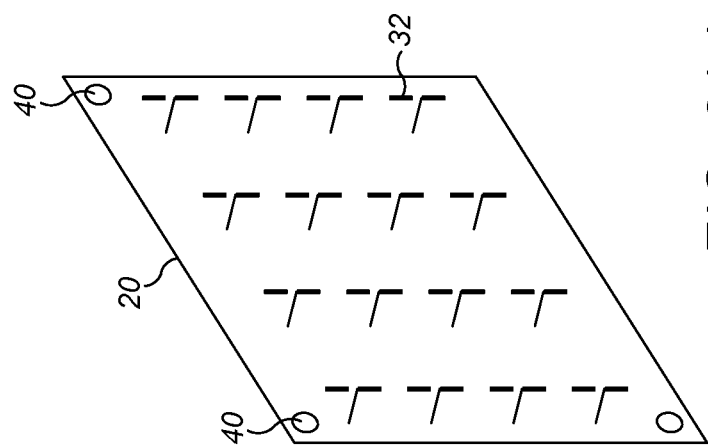

In FIG. 2a, the antenna unit 20 comprises a set of a plurality of optical elements 40. In this example, the optical elements 40 are arranged at the edges, e.g. corners, of the array of the antenna elements. The example shown is an antenna unit comprising three optical elements. Further examples may comprise 1, 2, 4, 5, 6 or more optical elements, e.g. optical receivers or transceivers. In some examples, the antenna unit 20 uses one or more of the optical elements 40 for providing an optical link. Further optical elements 40 may be present which can be regarded as spare.

In FIG. 2b, a further example of antenna unit 30 comprises a set of a plurality of optical elements 40. The optical elements 40 are arranged adjacent to each one of radio antenna elements 32. In some examples, the antenna unit 30 may be considered as comprising a plurality of communication modules 35, each communication module comprising one or more antenna elements 32 and one or more optical element 40. The communication modules 35 are arranged in an array. As such, the radio antenna elements and optical elements are arranged in an array. The optical elements 40 may be considered as integrated with the radio antenna element. The use of a plurality of identical modules comprising both an antenna element and an optical element provides for preserving how the antenna elements are built and modularity. The use of modules 35 allows for more flexibility, more capacity for future scalability, and more robustness. For example, the arrangement allows for a higher number of optical elements (e.g. photo receivers to receive the same optical link), compared to the example of FIG. 2a. In some aspects, the large number of optical elements provides for redundancy or simplifies manufacturing by using the same communication module 35.

As shown in FIGS. 2a and 2b, an antenna unit 20,30 comprises a plurality of antenna elements 32 or radio antenna elements. The antenna elements 32 may also be referred to as an antenna. The antenna elements may be arranged in two dimensions over an antenna surface or substrate. The antenna elements may be arranged in an array, for example, comprising antenna elements arranged in rows and columns of individual antenna elements. In some examples, the antenna elements are dual-polarized antenna elements. In some examples, the antenna may be an Advanced Antenna System (AAS). The AAS may comprise an antenna array closely integrated with the hardware and software required for transmission and reception of radio signals, and signal processing algorithms to support the execution of AAS features (such as beamforming and MIMO). As such, the AAS is able to utilize the antenna array to perform functions such as beamforming and MIMO communication.

For example, beamforming can direct radio energy through a radio channel toward a specific wireless device (as a receiver) improving throughput and capacity. Similarly, when receiving, beamforming is the ability to collect the signal energy from a specific wireless device (as a transmitter). The beams formed by an AAS can be continually adapted to the surroundings or radio channel to give high performance in both uplink and downlink.

In some examples, the optical elements 40 of a set (e.g. on an antenna unit 20;30) are configured to transmit/receive individual signals, i.e. are individually controlled. The optical elements may provide spatial multiplexing (e.g. optical MIMO). The plurality of optical elements allows for simultaneous optical links with a plurality of wireless devices by using spatial multiplexing (e.g. from many AGVs). In the case where two or more optical elements receive the same information (from a common optical link), this increases the robustness of the link (i.e. multi-path reception). The signal from the plurality of receiving optical elements may be combined to generate a single signal, for example, with improved signal to noise ratio compared to signal received from a single optical element. A common signal ensures increased reliability and/or keeping costs low. In some examples, the optical elements may be driven to transmit a common signal. In further examples, a set of optical elements on an antenna unit comprises one or more optical elements.

AAS provides for adaptivity and steerability, in terms of adapting the antenna radiation patterns to rapidly time-varying traffic and multi-path radio propagation conditions, compared to conventional antenna systems. This makes AAS advantageous for the present indoor scenario and, specifically, for serving manufacturing plant applications. In the present disclosure, the access network comprises both antennas (e.g. AAS) and optical elements. The optical elements provide for optical communication with the wireless devices (e.g. AGV). The optical communication is free space optical communication, i.e. line of sight transmission/receiving of modulated optical signals. Thus, optical fibers are not required for the optical communication.

The optical elements 40 may be optical receivers, optical transmitters or optical transceivers. Optical elements are a part of the access network and the wireless device. The optical receivers may be considered as photo-detectors, e.g. photodiodes. This enables the reception of optical signals generated by an optical transmitter on the wireless device. The optical transmitters may be considered as photo-emitters, e.g. LED transmitters. The optical transceivers may be any combination of technologies for optical transmitting and receiving.

For the example that the optical elements of the access network are optical transceivers, the optical elements enable bi-directional optical links between the antenna and the wireless device. In this example, the wireless device comprises one or more optical transceivers, rather than the merely a transmitter for one-way (uplink) communication with an optical receiver.

The set of optical elements 40 are associated with the radio antennas 20;30. In some examples, one or more optical element 40 is co-located with the radio antenna elements 32. In some examples, a set of a plurality of optical elements is co-located with the radio antenna elements. The network node may comprise an antenna unit, or a substrate, supporting one or more radio antenna elements and one or more optical elements. As such, the radio antenna and optical elements may be considered as integrated. In other examples, the optical elements are located on a separate unit or substrate from the radio antenna elements. The optical elements may be sufficiently close to the radio antenna elements that a particular wireless device communicating with radio antenna is in communication with a known optical element or known set of optical elements, e.g. the set of optical elements on the same antenna unit as the radio antenna elements in communication with the wireless device. The radio and optical communication is therefore integrated for communication with a same (or associated) network node.

FIGS. 2a and 2b shows examples of an antenna unit comprising both radio antenna elements 32 and optical elements 40. The access network comprises a plurality of antenna units of the same or different types. The radio antenna elements of the radio antenna are arranged in an array. In some examples, at least one of the optical elements is an optical receiver. The antenna unit may be considered as a network node, or a part of a network node.

In these examples, the antenna unit 20;30 comprises a plurality of optical elements 40. The optical elements of an antenna unit may operate independently from each other and/or in the same function, i.e. providing duplication. For example, for a plurality of optical receivers, optical reception is made more robust by using increasing the number of optical receivers. One or more of the plurality of optical elements may be considered a spare, or used to receive a signal which is combined with a signal from another of the optical elements. In some examples, different ones of the plurality of optical elements receives data from different wireless devices.

The optical communication described requires a line of sight between the communicating optical elements 40 (e.g. the access network antenna and an optical transmitter on the wireless device). If the wireless devices (e.g. vehicle or AGV) are in motion, it can happen that an optical link is not always available, because line of sight has been temporarily lost. The radio link does not require line of sign, and so will always be present. The dropping of an optical link is not critical, the optical links are used to support the radio links when available.

The access network is configured so that the total number of optical links is relatively stable, to ensure a substantial offload of the radio layer. This provides for a greater efficiency and robustness of the entire network.

Figure 3:
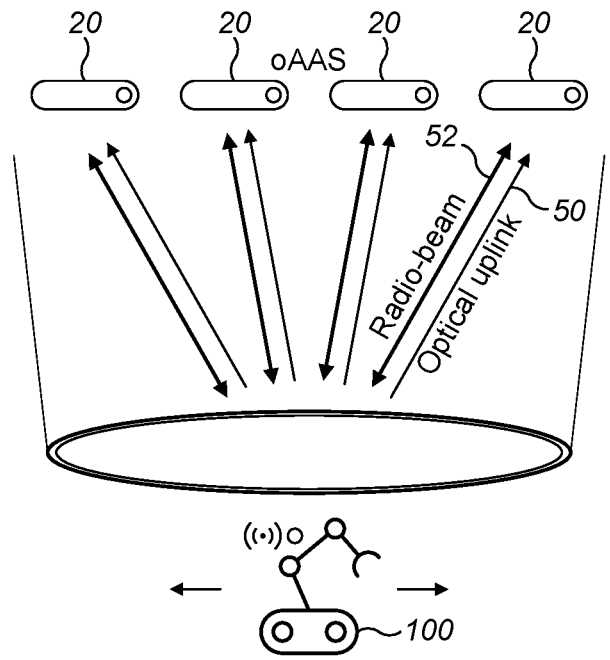
FIG. 3 is a schematic diagram illustrating communication between the access network and a wireless device.

FIG. 3 illustrates an example arrangement used to connect a wireless device 100 (e.g. AGV) to an access network having a plurality of network nodes, e.g. comprising the antenna units 20. The wireless device 100 is connected by a radio link in the downlink direction (i.e. access network to wireless device). In some examples, the radio link is a 5G (e.g. NR) radio link, which can provide a low-latency radio link. The uplink is provided through the optical link. The use of the optical link offloads the uplink radio resources to the optical spectrum. In some examples, the access network also provides an uplink radio link, for example, in case of loss of the optical link. In some examples, the radio link is always set up, even if the optical link is operating. A radio scheduler will manage both the radio frequency and optical resources, and is configured to determine at each point in time how many layers (e.g. radio layers, optical layer) are possible or required to transmit data.

In some examples, the optical link carries a real-time, continuous, video streaming from the wireless device to the access network (and then, for example, to cloud computation). The optical link carries the whole of the video streaming data. This requires the optical transmitter on the wireless device (e.g. AGV) and the optical receiver (e.g. on the radio antenna) to be in line-of-sight. The requirement of the line-of-sight condition is practical due to the indoor deployment of the access network, which is more controllable than an outdoor deployment, e.g. visual obstacles can be avoided more easily. In some examples, the optical link is only for uplink, and the optical elements do not provide for downlink optical communication.

The setup or tear-down of optical links can be managed as it is done for a radio channel. For example, as if the radio link and optical link are using a same allocation of "time-frequency" resource simultaneously. For example, the optical layer is realized with a simple "media conversion" of a conventional radio layer. For example, the baseband processing of the optical signal is carried out using a radio baseband processing. The baseband is then converted to an optical frequency instead of a radio frequency. Even if controlling the optical link as a radio link does not use the optical resource in an optimal way, it allows to simplify the management of the two technologies/domains (radio and optical). In this way, the radio management controls the one or more optical links.

The proposed solution allows offloading the uplink traffic in an indoor scenario over an optical link. With this technique the co-existent indoor 5G cellular network is lightened by offloading a large amount of data.

The optical link may be coupled with the radio link using beamforming. In some examples, the radio link uses a millimeter wavelength (mmW) radio channel. The optical uplink can benefit from tracking provided by directional beamforming of the radio link, making the offload easy to achieve.

In some examples, layers of the radio protocol stack are also used for the optical links. Additional optical links can be managed as additional carriers (or layers) to the carriers/layers already supported by the radio links.

The examples are compatible with a smooth migration from communication using only a radio link towards the described examples, as legacy systems can continue to use cellular radio links only in both uplink and downlink until the optical offload ability is installed.

For examples of the use case of the present disclosure, the uplink channel (from wireless device 100 to access network) requires a larger amount of data transfer than the downlink channel. For example, a continuous image/video streaming is fed from the wireless device (e.g. vehicle) to a visual navigation engine in the network (e.g. in a cloud). Latency performance is more important on the downlink channel than on the uplink channel. For example, commands to the wireless device, e.g. direction instructions should arrive at the wireless device (e.g. vehicle) from the network as soon as possible. For example, a command to the vehicle to "stop", e.g. in case of an obstacle on the path, needs to be sent with a low latency.

In some examples, data communication in the downlink direction uses only the radio frequency, when the optical channel is used for uplink communication. In this case, there is no data being transmitted in the uplink radio frequency communication. In some examples, control signalling is transmitted from the wireless device in the uplink direction when the optical channel is used for uplink communication. In some examples, the optical communication is only in the uplink direction. In this case, data is transmitted exclusively by the radio frequency link in the downlink direction, and data is transmitted exclusively by the optical link in the uplink direction. References to uplink and downlink communication may refer to data communication only, i.e. not for control signalling. In some aspects, the access network and wireless device using the radio link only for downlink communication may mean that the wireless device transmits no uplink radio communication, or the wireless device transmits only control signaling in the uplink direction (i.e. no data traffic).

5G can provide with radio infrastructure, an enhanced mobile broadband (eMBB) slice plus an ultra-reliable low-latency communication (uRLLC) slice. However, the network requirements for the described examples are asymmetric in uplink and downlink, which results in a waste of radio resources. In addition, the wireless devices (e.g. vehicle) are allowed to move freely within the coverage of the indoor access network comprising a set of radio antennas, e.g. providing small cells. Every antenna on the path of the wireless device (e.g. AGV) provides the same performance in both uplink and downlink with a transparent handover.

The access network or wireless device converts the signal to be transmitted to an optical frequency as a final step prior to transmission. This optical conversion is carried out by a simple media conversion (e.g. from/to the baseband processor), and this function can be achieved at the antenna or network node without affecting higher radio layers.

In some examples, the optical link utilizes an optical physical layer, i.e. layer 1. The higher layers, e.g. layer 2 and above are common to the radio link. In some examples, one or more layer 2 and/or layer 3 protocols used for the radio link are also used for the optical link, e.g. the Medium Access Control (MAC), Radio Link Control (RLC), packet Data Convergence Protocol (PDCP) and/or Radio Resource Control (RRC) protocol used by the NR (and other radio access technologies) radio link. In some examples, one or more layer 2 or 3 protocols are specific to the optical link, e.g. the radio protocol is not additionally used for the optical link.

Examples of the disclosure use the additional optical resources as equivalent to a set of RF carriers. The radio control for the radio link, e.g. one or more of the RLC, MAC, RRC layer, treats the optical layer as an additional RF carrier/layer.

In some aspects, the radio link and optical link share a common control plane. The control plane is that of the radio link, i.e. cellular radio access technology. In some examples, the handover function of the radio link is common to the radio and optical links, e.g. as provided by a radio controller implementing a Radio Resource Management (RRM) radio function and/or other protocols and functions. Thus, the handover of a radio link of a wireless device to a different antenna of the access network is accompanied by a corresponding handover of the optical link of the wireless link to an associated optical element. In some examples, one or more Layer 1 to 3 radio protocols are adapted to control the radio and optical links. As such, the optical link may utilize the radio protocol without substantive adaptation, utilize the radio protocol with an adaptation or (e.g. for the physical layer) use a specific optical protocol.

The access network is configured to provide for handover of the wireless device between different sets of optical elements, e.g. between different antennas/network nodes. In some examples, a node of the access network transmits control signaling to the wireless device, to control the handover (e.g. to inform the wireless device of a radio and optical node/cell identifier to use for further communication). The set of optical elements located on, or associated with, a radio antenna may be considered as providing an optical link which is associated with that radio antenna or radio cell. Such an optical link may be referred to as an "optical cell". The access network is configured to handover the optical connection to another "optical cell", i.e. another set of optical elements located on, or associated with, another radio antenna 20;30. The optical handover is initiated and/or controlled by the access network. This is different to, for example, a non-cellular wireless local area network such as Wi-Fi (IEEE 802.11), in which movement between Wi-Fi access points requires re-association and is initiated from the wireless device.

Thus, the access network of the present disclosure provides for handover of both the radio and optical links. The radio and optical links are both managed by a radio controller in the access network, e.g. in a network node. In some examples, the radio controller controls the optical link as an additional radio resource, e.g. with the same scheduling used for the radio resources. As such, optical resources are scheduled as additional radio spectrum. The protocols for allocation and control of the radio resource are (at least partially) re-used for the optical link. The use of handover is useful in industrial applications, for example to maintain a deterministic latency and performance across the whole area. The present disclosure comprises the combination of a radio cellular technology and an optical link.

Aspects of the disclosure relate to a single antenna unit comprising both optical elements 40 and radio antenna elements 32. As such, the radio antenna (e.g. AAS) comprises integrated optical elements 40. Aspects of the disclosure further relate to a common protocol stack (i.e. the cellular radio stack) for radio and optical links, e.g. down to the baseband processing. In some examples, handover between antennas is carried out for the radio link together with the optical link. Having RF and optical elements co-located in the antenna unit allows both the radio and optical links to use as much of the radio processing as possible prior to transmission. For example, having the RF and optical elements co-located, or at least adjacent or in close proximity, allows for handover of the radio and optical links together. Thus, a single handover decision by the access network provides for joint handover of both the radio and optical links at the same time and to the same target antenna unit or associated radio frequency antenna and set of optical elements.

Examples of the access network may include any "radio function split" strategy, i.e. the distribution of radio functions between the same or different nodes. For example, one or more of an antenna (antenna unit), radio unit and baseband processing unit may be in the same node (e.g. monolithic base station) or different nodes of the access network. In some examples, the optical link differs from the radio link only in the physical layer (i.e. in the "last hop" towards the wireless device).

Examples of the present disclosure increase the access network capacity, and also makes communication with the wireless device more resilient. This is a useful requirement for certain industrial applications, and not yet completely satisfied by current networks. The network may be viewed as slices, with each network slice being an isolated end-to-end network. The access network is used to deliver not only Enhanced Mobile Broadband (eMBB) slides, but for example also Ultra Reliable Low Latency Communications (URLLC) and/or Massive Machine Type Communications (mMTC) slices. All these slices compete for the same radio spectrum. By lightening the eMBB slice, though optical offload, it is possible to improve the provision of uRLLC/mMTC requirements.

The optical link or channel is managed by the access network as an additional radio resource and is managed as one or more radio layer. In some respects, the optical link is considered as an additional layer, in the same way that multiple layers are present for multiple-input and multiple-output (MIMO) radio links. This simplifies management of the optical channel and help to reduce costs. By offloading the radio links, it also helps to preserve the high performance and reliability of 5G without the need to exclusively dedicate radio resources, e.g. to robots and other machinery in the factory.

The optical link may be used in uplink and downlink, or only in uplink. The use of the optical link in only one direction (for example uplink that requires higher traffic) has a lower cost, since it is not necessary to have a complete transceiver on the antenna unit and on the wireless device, e.g. the optical link only needs a receiver on the antenna unit and transmitter on the wireless device (e.g. AGV). In this case, however, the downlink channel is guaranteed by the presence of the radio downlink channel. Using radio (e.g. 5G) for the downlink direction may be preferred as typically the downlink direction is used to send control signals to the robot/AGV. The control signals may be very latency critical (down to few milliseconds round trip time) and the 5G radio link can be better controlled in terms of latency. On the contrary, for the uplink direction, the dominant parameter is the high bandwidth to stream video or other data from the robot/AGV towards the cloud. So, here, an optical uplink can be beneficial.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Figure 4:
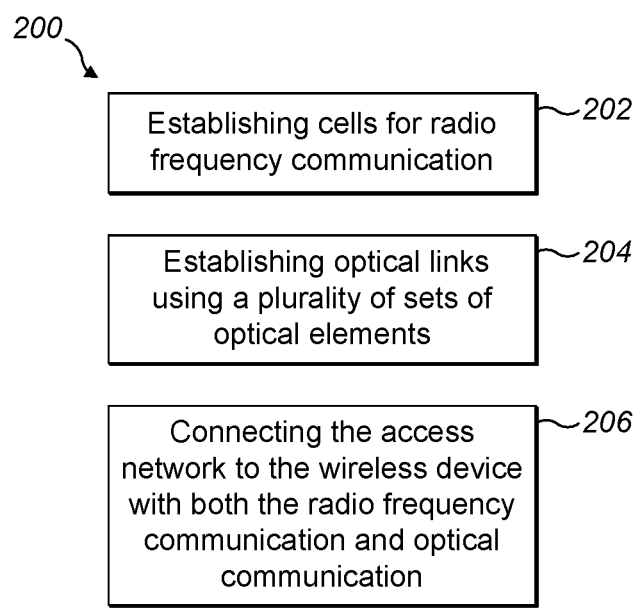
FIG. 4 is a flow chart of an example of a method of the access network.

FIG. 4 is a flow chart of an example of a method 200 in an access network for communication with a wireless device. Corresponding steps are applicable to a network node of the access network. The method comprises establishing 202 a cell for radio frequency communication with the wireless device. In 204, the network node or access network establishes an optical link using a set of optical elements (for a network node) or a plurality of sets of optical elements (for an access network) which configured for optical communication with the wireless device. In some examples, the establishing of the optical link uses control signalling which corresponds to, or is substantially also used for, establishing radio link control. The establishing links with a plurality of sets of optical elements may refer to establishing only one link at a time for a wireless device, or establishing a plurality of links at a time for a wireless device. In some aspects, the establishing comprises setting up or reconfiguring a radio/optical link with a wireless device for a particular network node or for the access network.

In 206, the network node or access network connects 206 the network node or access network to the wireless device with both the radio frequency communication and optical communication. The access network connects to the wireless device with the radio frequency communication at least in a downlink direction, and connects to the wireless device with the optical communication at least in an uplink direction. The step of connecting to the network node or access network may refer to transmission of data between the network node and wireless device.

The steps 202,204 of establishing an optical link and radio link may be considered as optional or combined with the connecting 206, and the disclosure may refer merely to the transmission 206 of data between the network node and wireless device. In some examples, the transmission of data using the optical and radio link both use a baseband processing configured for radio communication.

Figure 5:
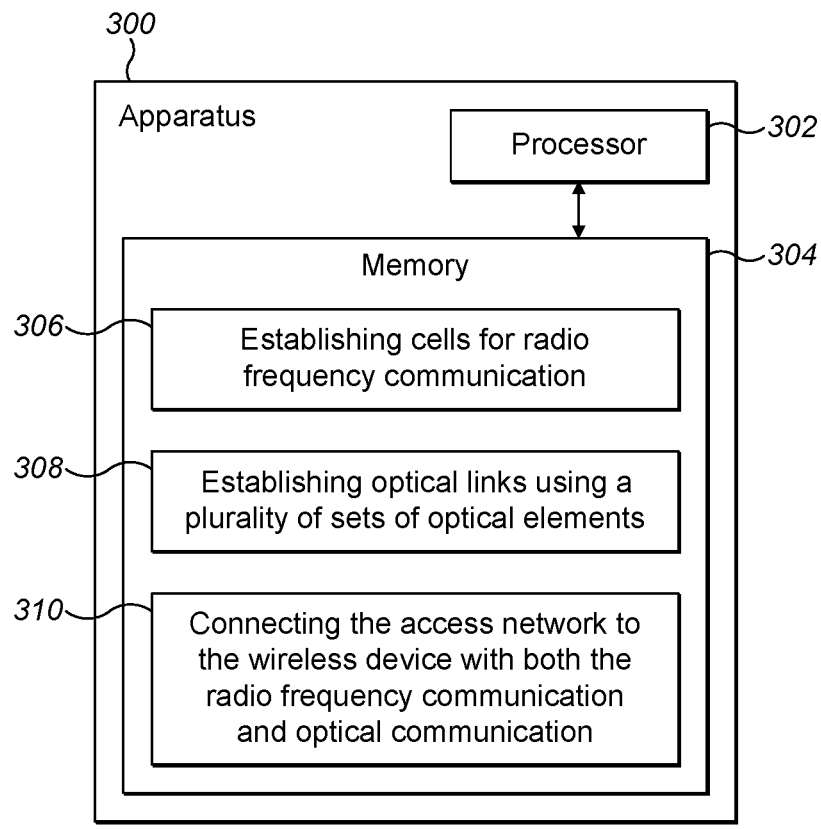
FIG. 5 is a schematic of an example of apparatus of the access network.

FIG. 5 is an example of a network node 300. The network node may comprises or is connected to the antenna elements and optical elements, e.g. to an antenna unit 20,30. The network node 300 is part of the access network. The network node comprises a processor (or processing circuitry) 302 connected to a memory 304. In some aspects, the memory 304 stores a computer program for execution of the method of operation of communication with the wireless device of any example. The processor 302, together with the memory, is arranged to establish 306 a cell for radio frequency communication with the wireless device. The processor is further arranged to establish 308 an optical link via a set of optical elements configured for optical communication with the wireless device. In some examples, the establishing of the optical link uses control signalling which corresponds to, or is substantially also used for, establishing radio link control. In some aspects, the establishing comprises setting up or reconfiguring a radio/optical link with a wireless device for a particular network node or for the access network.

The processor 302 is further arranged to connect 310 the network node to the wireless device with both the radio frequency communication and optical communication. The access network connects to the wireless device with the radio frequency communication at least in a downlink direction, and connects to the wireless device with the optical communication at least in an uplink direction. The step of connecting to the network node or access network may refer to transmission of data between the network node and wireless device.

The operations 306,308 of establishing an optical link and radio link may be considered as optional or combined with the connecting 310, and the disclosure may refer merely to the transmission 310 of data between the network node and wireless device. In some examples, the transmission of data using the optical and radio link both use a baseband processing configured for radio communication.

Figure 6:
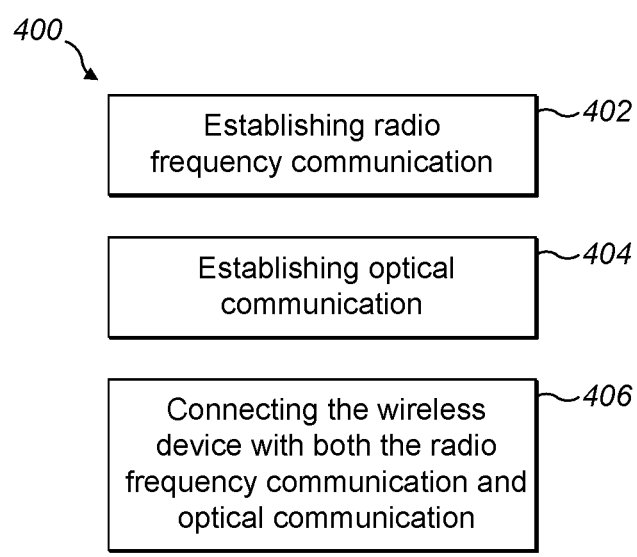
FIG. 6 is a flow chart of an example of a method of the wireless device.

FIG. 6 is a flow chart of an example of a method 400 in a wireless device 100. The method comprises establishing 402 radio frequency communication with a cell of the access network. In 404, the wireless device establishes an optical link using one or more optical elements which are configured for optical communication with a network node. The establishing links may be with a plurality of sets of optical elements or a plurality of links at a time for a wireless device with the same or different network node. In some aspects, the establishing comprises setting up or reconfiguring a radio/optical link with a particular network node or for the access network.

In 406, the network node or access network connects 406 the wireless device to the network node or access network with both the radio frequency communication and optical communication. The wireless device connects to the access network with the radio frequency communication at least in a downlink direction, and connects to the access network with the optical communication at least in an uplink direction. The step of connecting to the network node or access network may refer to transmission of data between the network node and wireless device.

The steps 402,404 of establishing an optical link and radio link may be considered as optional or combined with the connecting 406, and the disclosure may refer merely to the transmission 406 of data between the network node and wireless device.

Figure 7:
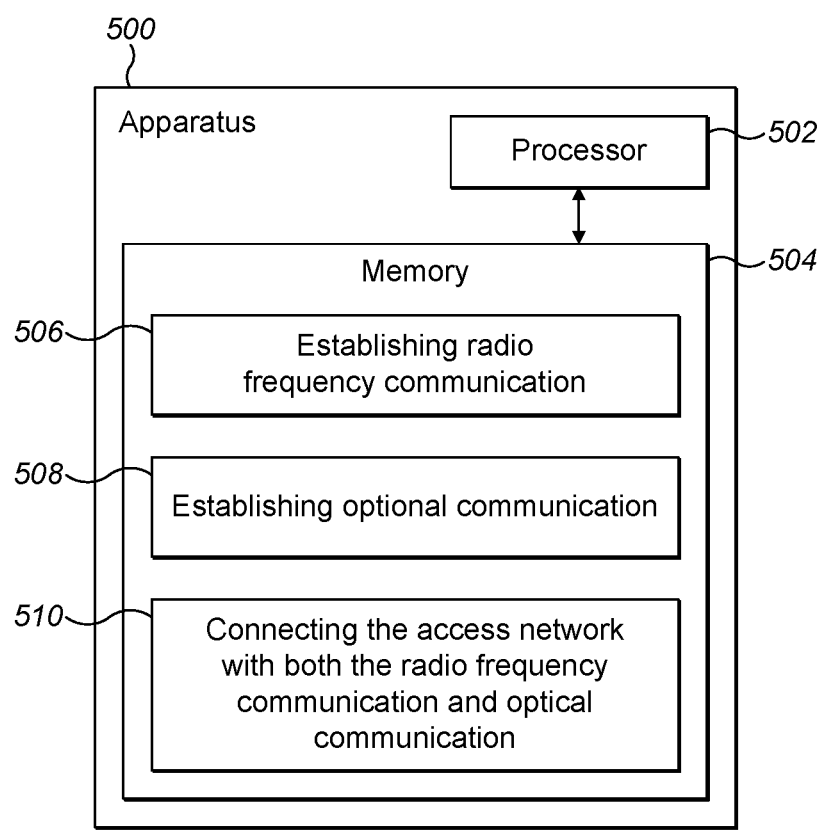
FIG. 7 is a schematic of an example of apparatus of the wireless device.

FIG. 7 is an example of a wireless device 500, e.g. corresponding to AGV 100. The wireless device 500 may comprise or be connected to antenna elements and optical elements to connect to a network node as part of the access network. The wireless device comprises a processor 502 (or processing circuitry) connected to a memory. In some aspects, the memory 504 stores a computer program for execution of the method of operation of communication with the wireless device of any example. The processor, together with the memory, is arranged to establish radio frequency communication with a cell of the access network.

The processor is further arranged to establish 506 an optical link using one or more optical elements which are configured for optical communication with the network node. The establishing links may be with a plurality of sets of optical elements or a plurality of links at a time for a wireless device with the same or different network node. In some aspects, the establishing comprises setting up or reconfiguring a radio/optical link with a particular network node or for the access network.

In some examples, the establishing of the optical link uses control signalling which corresponds to, or is substantially also used for, establishing radio link control. In some aspects, the establishing comprises receiving and implementing control signalling setting up or reconfiguring a radio/optical link for a particular network node or for the access network.

The processor 502 is further arranged to connect 510 the wireless device to the network node or access network with both the radio frequency communication and optical communication. The wireless device connects to the access network with the radio frequency communication at least in a downlink direction, and connects to the access network with the optical communication at least in an uplink direction. The step of connecting to the network node or access network may refer to transmission of data between the network node and wireless device. In some examples, the transmission of data using the optical and radio link both use a baseband processing configured for radio communication.

The steps 506,508 of establishing an optical link and radio link may be considered as optional or combined with the connecting 510, and the disclosure may refer merely to the transmission 510 of data between the network node and wireless device.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 8:
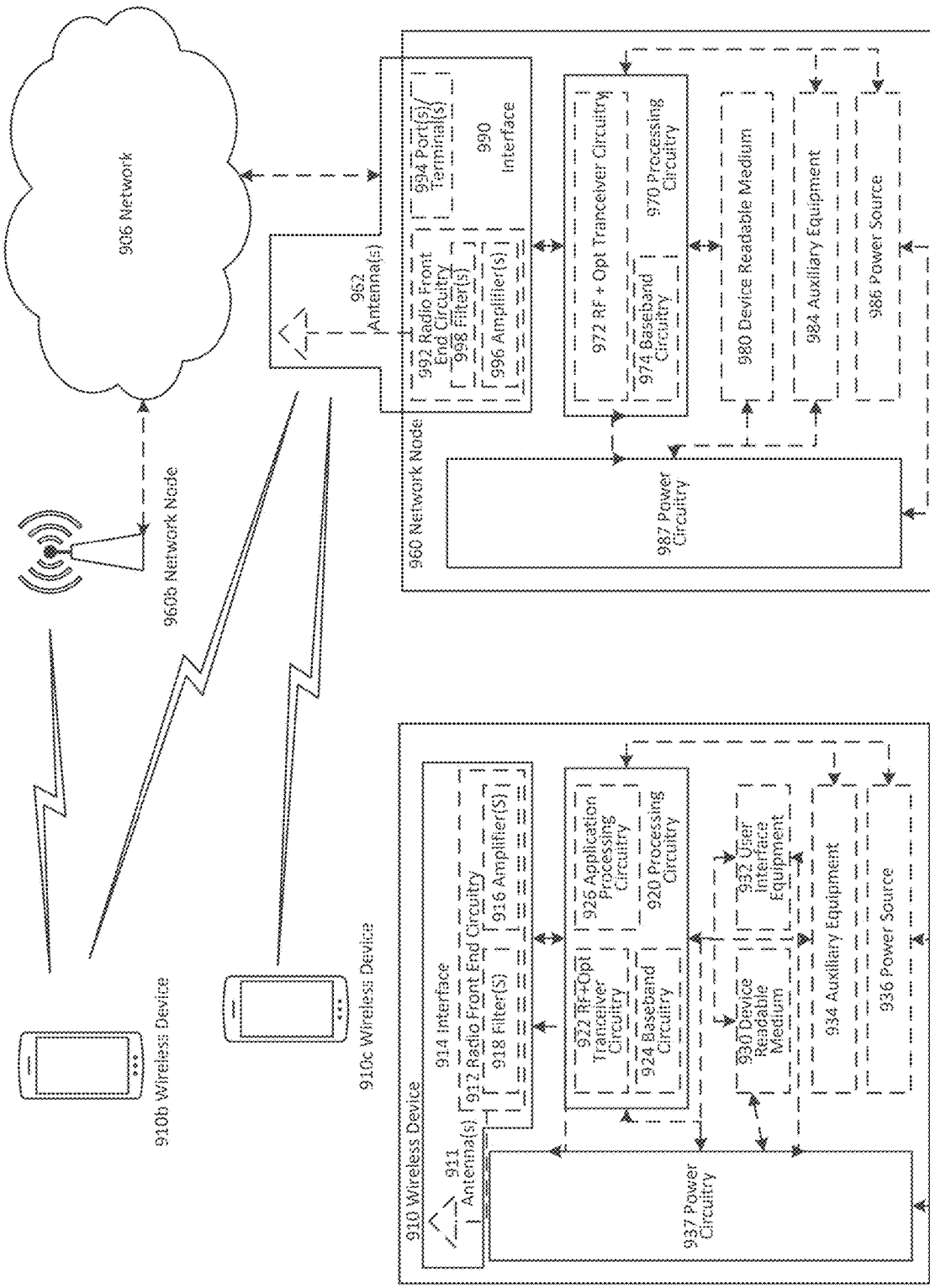
FIG. 8 is a block diagram illustrating an example network environment according to embodiments of the present disclosure.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 depicts a network 906, network nodes 960,960b, and wireless devices 910,910b, and 910c, which may correspond to the network node and wireless device described in other embodiments. The network nodes 960,960b may include or be connected to the antenna units 20,30 of any example. The network 906 may correspond to the access network comprising a plurality of the antenna units 20,30, or separate radio and optical antennas, supporting both radio and optical links. Aspects of the disclosure may relate to the access network or a network node of the access network, or the wireless device.

In practice, a wireless network may further include any additional elements suitable to support communication between wireless devices or between a wireless device and another communication device, such as a landline telephone, a service provider, or any other network node or end device. Of the illustrated components, network node 960 and wireless device 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or Zig Bee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and wireless device 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 9:
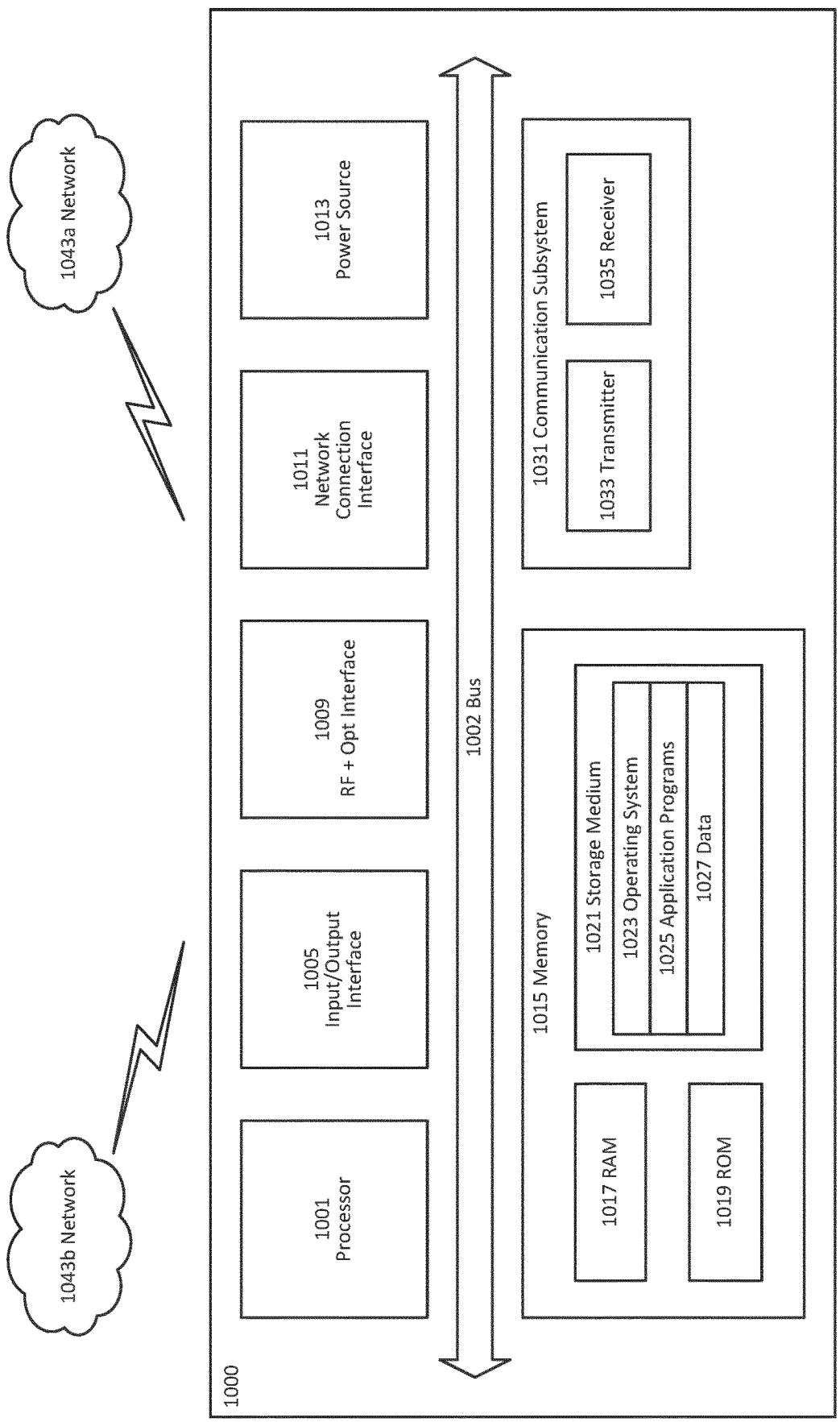
FIG. 9 illustrates one embodiment of a user equipment in accordance with various embodiments of the present disclosure.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units. The processing circuitry 970 may further include optical transceiver circuitry 972, which may be separate or combined with the RF transceiver circuitry. The processing circuitry 970, for example including baseband processing circuitry 974, may be configured to handle both RF and optical communication.

In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960 but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signalling and/or data between network node 960, network 906, and/or wireless devices 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or wireless devices via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown). In some examples, the optical transceiver circuitry is connected to the optical element 40 without passing through the interface 990 or radio specific front end circuitry.

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port. The antenna 962 may further comprise optical elements (e.g. as described above) for sending and/or receiving optical communications.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As illustrated, wireless device 910 includes antenna 911, interface 914, processing circuitry 920, device readable medium 930, user interface equipment 932, auxiliary equipment 934, power source 936 and power circuitry 937. The antenna 911 may comprise one or more optical element as described in any example. The wireless device 910 may include multiple sets of one or more of the illustrated components for different wireless technologies supported by wireless device 910, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within wireless device 910.

Antenna 911 may include one or more antennas or antenna arrays, configured to send and/or receive wireless signals, and is connected to interface 914. In certain alternative embodiments, antenna 911 may be separate from wireless device 910 and be connectable to wireless device 910 through an interface or port. Antenna 911, interface 914, and/or processing circuitry 920 may be configured to perform any receiving or transmitting operations (including radio and optical communication) described herein as being performed by a wireless device. Any information, data and/or signals may be received from a network node and/or another wireless device. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, wireless device 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or wireless devices via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components. The antenna 911 may further comprise optical elements (e.g. as described above) for sending and/or receiving optical communications. In some examples, the optical transceiver circuitry is connected to the optical element without passing through the interface 914 or radio specific front end circuitry.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 910 components, such as device readable medium 930, wireless device 910 functionality. Such functionality may is include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of wireless device 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920. The processing circuitry 920 further comprises optical transceiver circuitry 922 for the optical element(s). The optical transceiver circuitry 922 may be integrated with or separate to the RF transceiver circuitry. The optical transceiver circuitry 922 may connect to the optical element(s) 40 of the antenna unit without passing though the radio front end circuitry.

In certain embodiments, some or all of the functionality described herein as being performed by a wireless device may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of wireless device 910 but are enjoyed by wireless device 910 as a whole, and/or by end users and the wireless network generally.

Processing circuitry 920 may be configured to perform any determining, calculating, or similar operations (e.g., certain obtaining operations) described herein as being performed by a wireless device. These operations, as performed by processing circuitry 920, may include processing information obtained by processing circuitry 920 by, for example, converting the obtained information into other information, comparing the obtained information or converted information to information stored by wireless device 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

Optionally, user interface equipment 932 may provide components that allow for a human user to interact with wireless device 910. Such interaction may be of many forms, such as visual, audial, tactile, etc. User interface equipment 932 may be operable to produce output to the user and to allow the user to provide input to wireless device 910. The type of interaction may vary depending on the type of user interface equipment 932 installed in wireless device 910. For example, if wireless device 910 is a smart phone, the interaction may be via a touch screen; if wireless device 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into wireless device 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from wireless device 910, and to allow processing circuitry 920 to output information from wireless device 910. User interface equipment 932 may include, for example, a speaker, a display, vibrating circuitry, a USB port, a headphone interface, or other output circuitry. Using one or more input and output interfaces, devices, and circuits, of user interface equipment 932, wireless device 910 may communicate with end users and/or the wireless network, and allow them to benefit from the functionality described herein.

Auxiliary equipment 934 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. wireless device 910 may further comprise power circuitry 937 for delivering power from power source 936 to the various parts of wireless device 910 which need power from power source 936 to carry out any functionality described or indicated herein. Power circuitry 937 may in certain embodiments comprise power management circuitry.

Power circuitry 937 may additionally or alternatively be operable to receive power from an external power source; in which case wireless device 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of wireless device 910 to which power is supplied.

In some examples, one or more parts of the wireless device and network node are shared by the radio and optical links. For example, the optical and radio links may use a common baseband circuitry or the wireless device and network node use the radio baseband processing for optical communication. The processing circuitry may be configured to provide a common baseband processing for the optical and radio links. In some aspects, the baseband processing used for the optical link is the same as a radio baseband processing. As such, the baseband signal generated/received for the optical signal is the same as that for a radio signal. In some aspects, the Layer 2 and high layers are common for the radio and optical links. The common baseband circuitry allows the optical link to be controlled as a part of the radio link, e.g. as another carrier or radio layer. For example, the optical link uses one or more of a radio frame/subframe structure, time and frequency configuration of symbols, re-transmission (e.g. HARQ), allocation of data and/or control symbols, etc., which is the same as for the radio technology used for the radio link. In some aspects, the optical link is configured to have a bandwidth which is supported by the radio link. With a common baseband processing, the wireless device or network node generates baseband data for transmission which could be transmitted on either a radio or an optical link. When an optical link is available, the optical transceiver circuitry converts the baseband signal to an optical frequency. As such, the only difference between the radio link and optical link is in the transmission frequency, and not in the format of the data being carried. This allows control of the optical link, e.g. including handover, to be carried out by the radio technology (e.g. NR). Although the wireless device and network node are primarily described for radio communication, the wireless device and network node also comprise shared or separate elements and circuitry to provide for optical communication.

Figure 10:
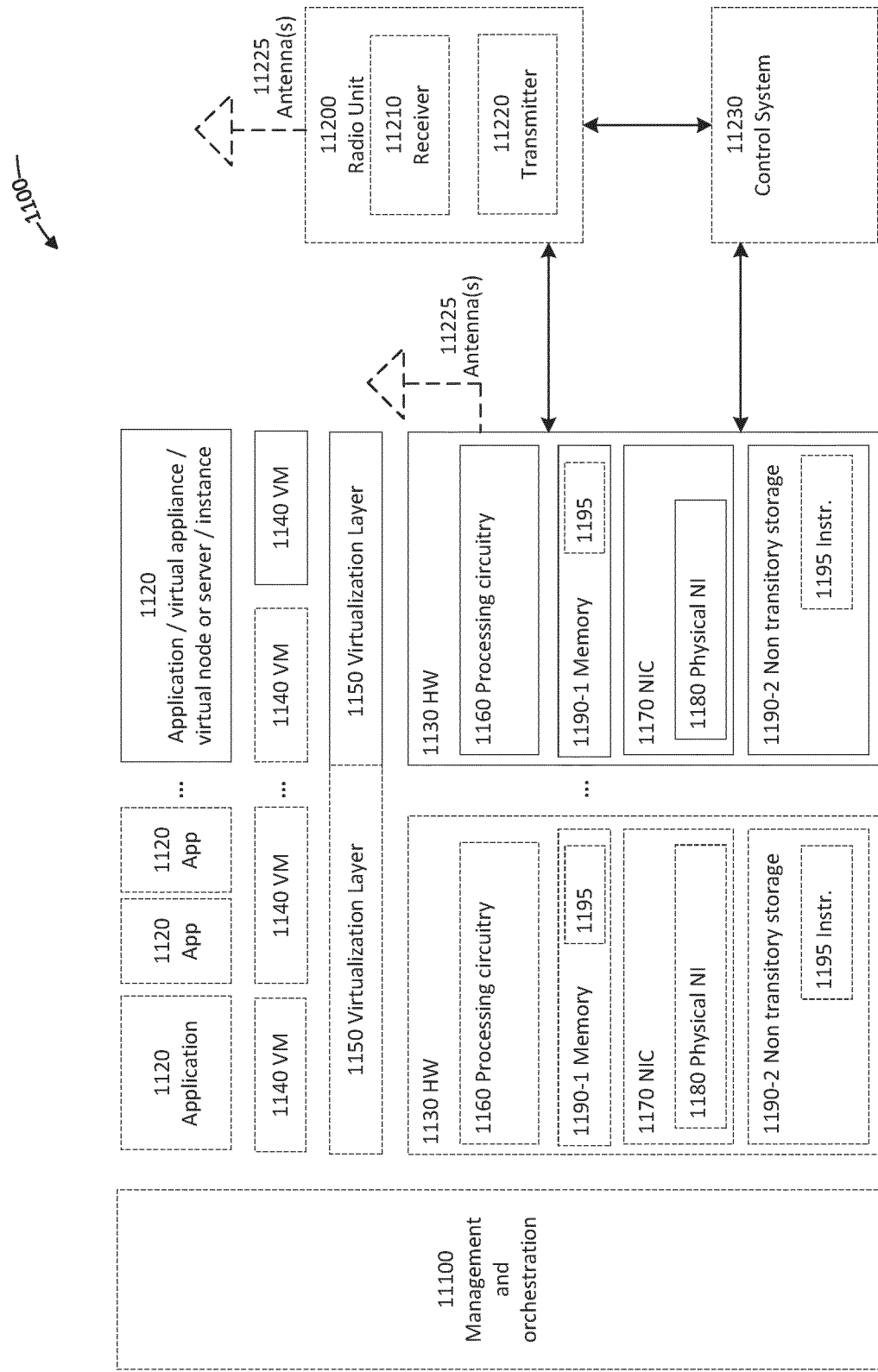
FIG. 10 is a schematic block diagram illustrating a virtualization environment according to embodiments of the present disclosure.

FIG. 9 illustrates one embodiment of a wireless device (UE) in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 10200 may be any UE identified by the 3rd Generation Partnership Project (3GPP), including a NB-IoT UE, a machine type communication (MTC) UE, and/or an enhanced MTC (eMTC) UE. UE 1000, as illustrated in FIG. 10, is one example of a wireless device configured for communication in accordance with one or more communication standards promulgated by the 3rd Generation Partnership Project (3GPP), such as 3GPP's GSM, UMTS, LTE, and/or 5G standards. As mentioned previously, the term wireless device and UE may be used interchangeable. Accordingly, although FIG. 9 is a UE, the components discussed herein are equally applicable to a wireless device, and vice-versa.

In FIG. 9, UE 1000 includes processing circuitry 1001 that is operatively coupled to input/output interface 1005, radio frequency (RF) and optical interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. The radio frequency (RF) and optical interface 1009 may comprise one or a plurality of elements or units. Storage medium 1021 includes operating system 1023, application program 1025, and data 1027. In other embodiments, storage medium 1021 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF and optical interface 1009 may be configured to provide a communication interface to RF components such as a transmitter, a receiver, and an antenna. The RF and optical interface 1009 may be further configured to provide a communication interface to optical components such as a transmitter, a receiver. Network connection interface 1011 may be configured to provide a communication interface to network 1043a. Network 1043a may encompass wired and/or wireless networks such as a local-area network (LAN), a wide-area network (WAN), a computer network, a wireless network, a telecommunications network, another like network or any combination thereof. For example, network 1043a may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 9, processing circuitry 1001 may be configured to communicate with network 1043b using communication subsystem 1031. Network 1043a and network 1043b may be the same network or networks or different network or networks. Communication subsystem 1031 may be configured to include one or more transceivers used to communicate with network 1043b. For example, communication subsystem 1031 may be configured to include one or more transceivers used to communicate with one or more remote transceivers of another device capable of wireless communication such as another wireless device, UE, or base station of a radio access network (RAN) according to one or more communication protocols, such as IEEE 802.10, CDMA, WCDMA, GSM, LTE, UTRAN, WiMax, or the like, and an optical link. Each transceiver may include transmitter 1033 and/or receiver 1035 to implement transmitter or receiver functionality, respectively, appropriate to the RAN links (e.g., frequency allocations and the like) and optical link. Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, optical communication, Wi-Fi communication, Bluetooth communication, and GPS communication. Network 1043b may encompass wired and/or wireless networks such as a local-area network (LAN), a wide-area network (WAN), a computer network, a wireless network, a telecommunications network, another like network or any combination thereof. For example, network 1043b may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

FIG. 10 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 10, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Figure 11:
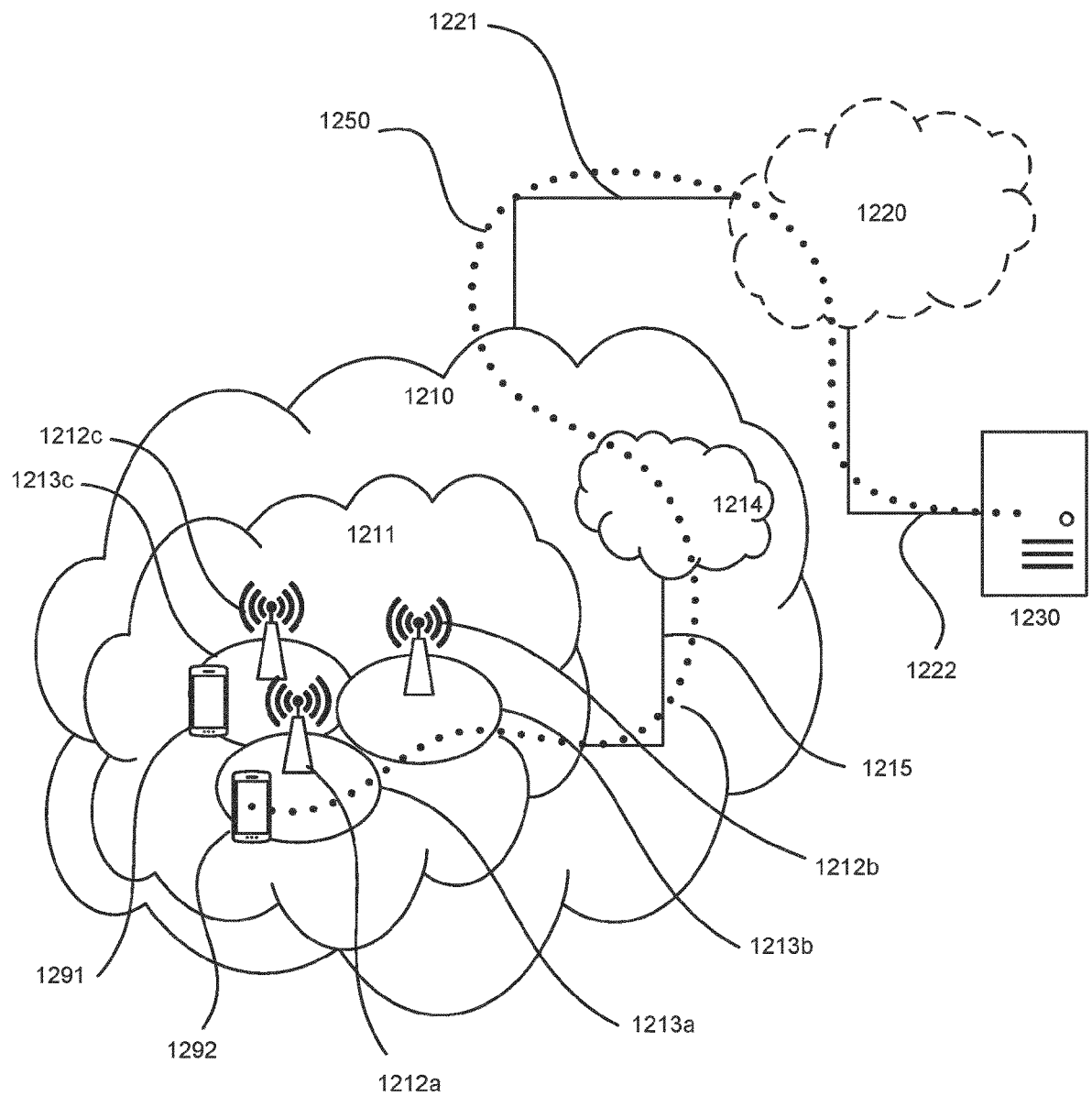
FIG. 11 illustrates a telecommunication network connected via an intermediate network to a host computer in accordance with some embodiments of the present disclosure.

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. The transmitters 11220 may also include an optical transmitter and/or receiver. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signalling can be effected with the use of control system 11230 which may alternatively be used for communication between the hardware nodes 1130 and radio units 11200.

FIG. 11 illustrates a telecommunication network connected via an intermediate network to a host computer in accordance with some embodiments. In particular, with reference to FIG. 11, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 11 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 12. FIG. 13 illustrates host computer communicating via a base station with a user equipment over a partially wireless connection in accordance with some embodiments In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

Figure 12:
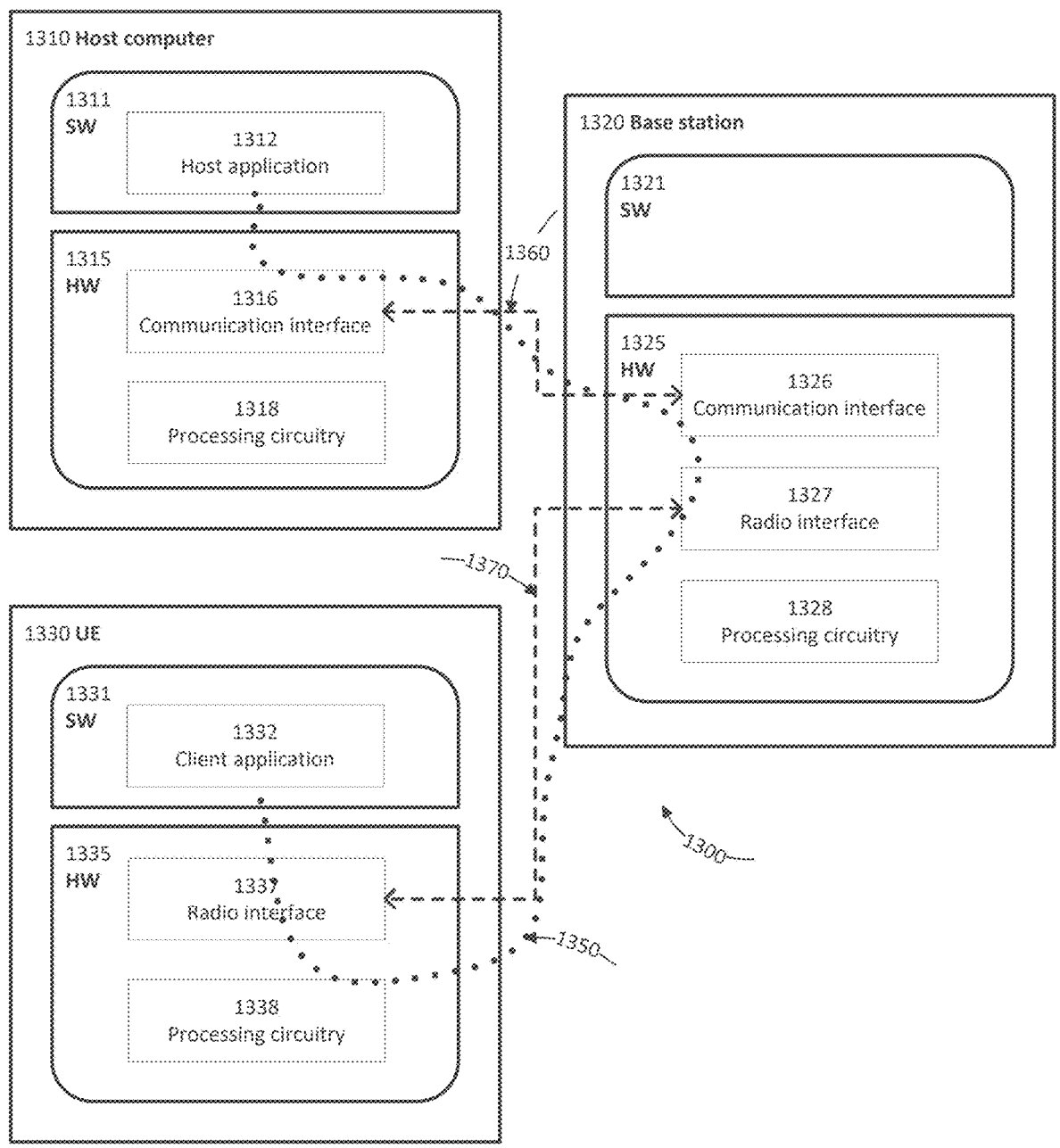
FIG. 12 illustrates a host computer communicating via a base station with a user equipment over a partially wireless connection in accordance with some embodiments of the present disclosure.
Figure 13:
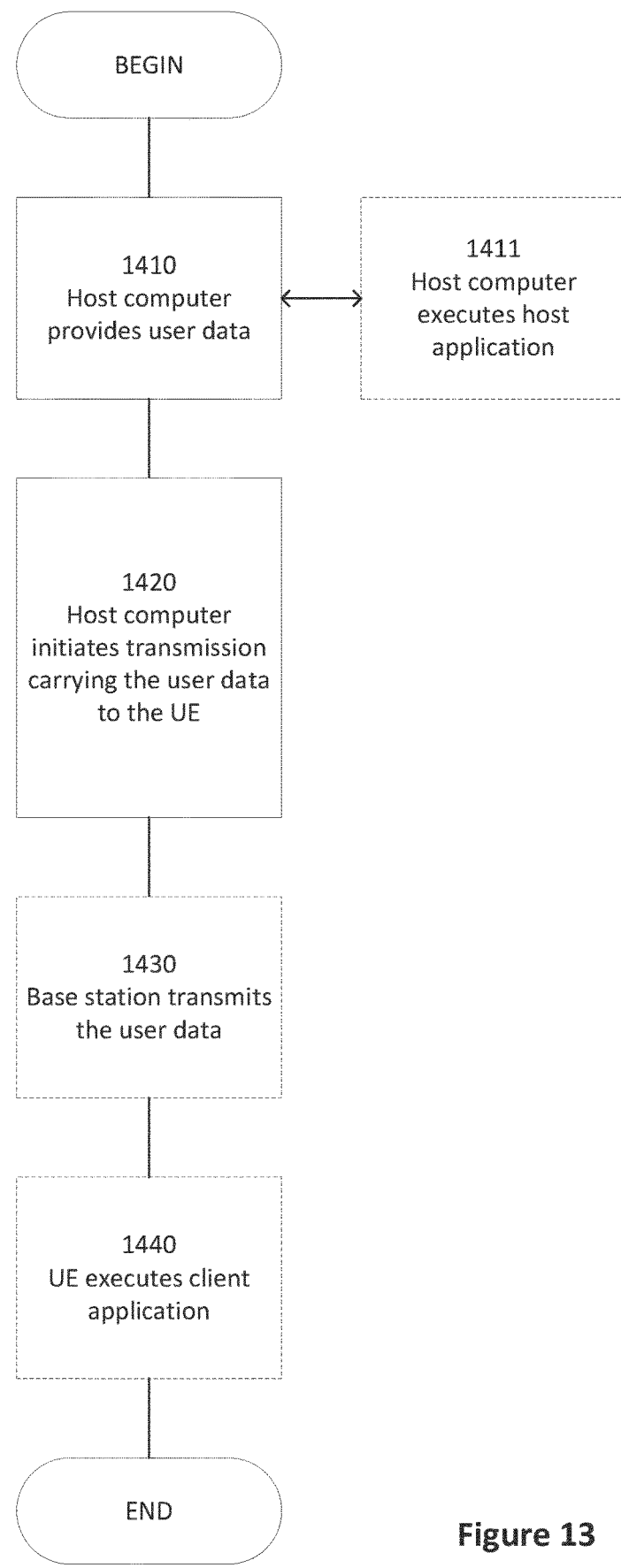
FIG. 13 is a flowchart illustrating a method implemented in a communication system, in accordance with one embodiment.

It is noted that host computer 1310, base station 1320 and UE 1330 illustrated in FIG. 12 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

In FIG. 12, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may eliminate an ambiguity in network signaling and thereby provide benefits such as improved reliability and efficiency, and avoiding wasting computational and air interface resources on error recovery.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 14:
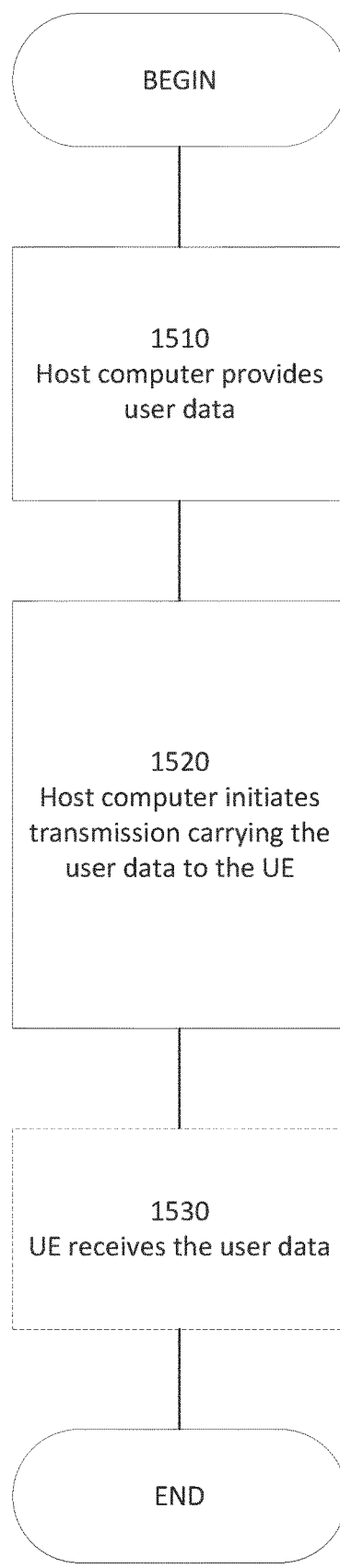
FIG. 14 is a flowchart illustrating another method implemented in a communication system, in accordance with one embodiment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure. Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The invention claimed is:

1. An access network for communication with a wireless device, the access network comprising:
   a plurality of antennas, each antenna being configured to provide a cell for radio frequency communication with the wireless device;
   a plurality of sets of optical elements configured for optical communication with the wireless device, the sets of optical elements being configured for spatial multiplexing and configured to combine signals received by two or more optical elements from a common optical link to generate a single signal, the single signal having a higher signal to noise ratio than individual signals received by the respective optical elements; and
   a processor and a memory, the memory containing instructions executable by the processor whereby the processor is operative to:
      connect to the wireless device with both the radio frequency communication and optical communication, the optical communication controlled by one or more layers of a protocol stack of the radio frequency communication;
      connect to the wireless device with the radio frequency communication at least in a downlink direction, the radio frequency communication being used in an uplink direction for control signaling, only;
      connect to the wireless device with the optical communication at least in the uplink direction; and
      handover the wireless device between cells for radio frequency communication with the wireless device and between the sets of optical elements, the handover of the wireless device between the sets of optical elements being controlled by the radio frequency communication.

2. The access network as claimed in claim 1, wherein:
   the radio frequency communication is in the downlink direction only when the access network is in uplink direction optical communication with the wireless device; and/or
   the optical communication is in uplink only.

3. The access network as claimed in claim 1, wherein the access network comprises a plurality of antenna units, wherein the antenna units comprise a substrate supporting one or more antenna elements and the set of one or more optical elements.

4. A method in an access network for communication with a wireless device, the method comprising:
   establishing cells for radio frequency communication with the wireless device;
   establishing optical links using a plurality of sets of optical elements configured for optical communication with the wireless device, the sets of optical elements being configured for spatial multiplexing and configured to combine signals received by two or more optical elements from a common optical link to generate a single signal, the single signal having a higher signal to noise ratio than individual signals received by the respective optical elements;
   controlling the optical communication by one or more layers of a protocol stack of the radio frequency communication;
   connecting the access network to the wireless device with both the radio frequency communication and optical communication, the access network connecting to the wireless device with the radio frequency communication at least in a downlink direction, and connecting to the wireless device with the optical communication at least in an uplink direction, the radio frequency communication being used in the uplink direction for control signaling, only; and
   handing over the wireless device between cells for radio frequency communication with the wireless device and between the sets of optical elements, the handover of the wireless device between the sets of optical elements being controlled by the radio frequency communication.

5. The method as claimed in claim 4, wherein:
   the radio frequency communication is in the downlink direction only when the access network is in uplink direction optical communication with the wireless device; and/or
   the optical communication is in uplink only.

6. The method as claimed in claim 4, comprising:
   using a common baseband processing for the radio frequency communication and optical communication; or
   using radio baseband processing for optical communication.

7. A wireless device for communication with an access network, the wireless device comprising:
   an antenna configured to provide radio frequency communication with a first cell of the access network;
   one or more optical elements configured for optical communication with the access network, the optical communication controlled by one or more layers of a protocol stack of the radio frequency communication, the one or more optical elements being configured for spatial multiplexing and configured to combine signals received by two or more optical elements from a common optical link to generate a single signal, the single signal having a higher signal to noise ratio than individual signals received by the respective optical elements;

a processor and a memory, the memory containing instructions executable by the processor whereby the wireless device is operative to connect to the access network with both the radio frequency communication and optical communication by:

connecting to the access network with the radio frequency communication at least in a downlink direction, the radio frequency communication being used in an uplink direction for control signaling, only;

connecting to the access network with the optical communication at least in the uplink direction; and handing over between the first cell and a second cell for radio frequency communication with the wireless device and between sets of optical elements of the one or more optical elements, the handover of the wireless device between the sets of optical elements being controlled by the radio frequency communication.

8. The wireless device as claimed in claim 7, wherein the wireless device is an autonomous guided vehicle.

9. The wireless device as claimed in claim 7, wherein:

the radio frequency communication is in the downlink direction only when the wireless device is in uplink direction optical communication with the access network; and/or the optical communication is in uplink only.

10. The wireless device as claimed in claim 7, wherein the radio frequency communication and optical communication comprise a common baseband processing.

11. A method in a wireless device for communication with an access network, the method comprising:

establishing radio frequency communication with the access network;

establishing optical communication with the access network using one or more optical elements, the one or more optical elements being configured for spatial multiplexing and configured to combine signals received by two or more optical elements from a common optical link to generate a single signal, the single signal having a higher signal to noise ratio than individual signals received by the respective optical elements;

controlling the optical communication by one or more layers of a protocol stack of the radio frequency communication;

connecting the wireless device to the access network with both the radio frequency communication and optical communication by:

connecting to the access network with the radio frequency communication at least in a downlink direction, the radio frequency communication being used in an uplink direction for control signaling, only;

connecting to the access network with the optical communication at least in the uplink direction; and handing over between cells of the access network for radio frequency communication with the wireless device and between sets of optical elements of the one or more optical elements, the handover of the wireless device between the sets of optical elements being controlled by the radio frequency communication.

12. The method as claimed in claim 11, wherein:

the radio frequency communication is in the downlink direction only when the access network is in uplink direction optical communication with the wireless device; and/or the optical communication is in uplink only.

13. The method as claimed in claim 11, comprising:

using a common baseband processing for the radio frequency communication and optical communication; or using radio baseband processing for optical communication.

14. A network node of an access network for communication with a wireless device, the network node comprising:

an antenna configured to provide a cell for radio frequency communication with the wireless device;

a set of one or more optical elements configured for optical communication with the wireless device, the sets of optical elements being configured for spatial multiplexing and configured to combine signals received by two or more optical elements from a common optical link to generate a single signal, the single signal having a higher signal to noise ratio than individual signals received by the respective optical elements;

a processor and a memory, the memory containing instructions executable by the processor whereby the network node is operative to:

connect to the wireless device with both the radio frequency communication and optical communication, the optical communication controlled by one or more layers of a protocol stack of the radio frequency communication;

connect to the wireless device with the radio frequency communication at least in a downlink direction, the radio frequency communication being used in an uplink direction for control signaling, only;

connect to the wireless device with the optical communication at least in the uplink direction; and handing over the wireless device between cells for radio frequency communication with the wireless device and between optical elements of the set of optical elements, wherein the handover of the wireless device between the optical elements of the set of optical elements is controlled by the radio frequency communication.

15. A method in a network node of an access network for communication with a wireless device, the method comprising:

establishing a cell for radio frequency communication with the wireless device;

establishing an optical link using a set of optical elements configured for optical communication with the wireless device, the sets of optical elements being configured for spatial multiplexing and configured to combine signals received by two or more optical elements from a common optical link to generate a single signal, the single signal having a higher signal to noise ratio than individual signals received by the respective optical elements;

controlling the optical communication by one or more layers of a protocol stack of the radio frequency communication;

connecting the network node to the wireless device with both the radio frequency communication and optical communication, the access network connecting to the wireless device with the radio frequency communication at least in a downlink direction and connecting to the wireless device with the optical communication at least in an uplink direction, the radio frequency communication being used in the uplink direction for control signaling, only; and handing over the wireless device between cells for radio frequency communication with the wireless device and between sets of optical elements, the handover of the wireless device between the sets of optical elements being controlled by the radio frequency communication.

* * * * *